May 3, 1949. J. E. ESHBAUGH 2,469,195
COOLANT RELIEF VALVE
Filed Sept. 5, 1946
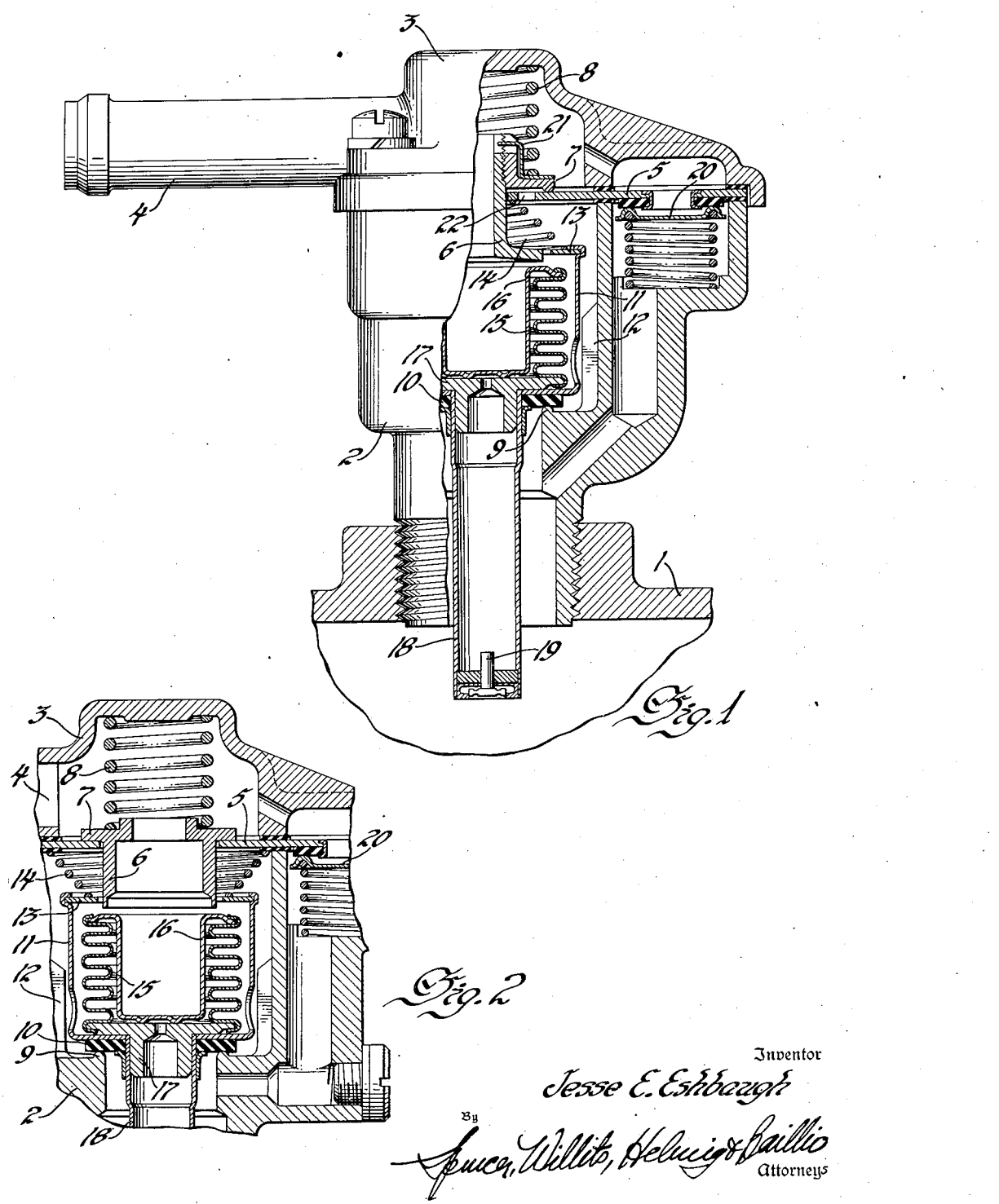
Inventor
Jesse E. Eshbaugh
By Spencer, Willits, Helwig & Baillio
Attorneys Patented May 3, 1949

2,469,195

UNITED STATES PATENT OFFICE 2,469,195

COOLANT RELIEF VALVE

Jesse E. Eshbaugh, Flint, Mich., assignor to General Motors Corporation, Detroit, Mich., a corporation of Delaware Application September 5, 1946, Serial No. 694,948

9 Claims. (Cl. 236—92)

This invention relates to an improved safety vent valve adapted for use with an airplane engine cooling system which operates under internal pressure by being sealed from the atmosphere. Weight reduction being important in aircraft the liquid cooled engine should have its cooling system closed so that the coolant content under internal pressure upon heat expansion will more effectively absorb and dissipate heat and enable reduction in size of the cooling system parts and the amount of coolant necessary. Means have been provided for relief of excess pressures to avoid bursting strains and suitable compensatory means have also been devised to provide a range of internal system pressures related to a scale of system operating temperature without substantial disturbance by atmospheric pressure differences at various altitudes. A device for the purpose referred to is disclosed in copending application Serial No. 570,149, filed December 28, 1944, over which the present valved vent represents an improvement, and among other things affords an increased measure of reliability in that should the valve become partly ineffective during high temperature flight the cooling medium will not be rapidly lost from the system but the loss will be retarded to an extent to enable continued flight for a reasonable time sufficient to bring the airplane to a safe landing.

More particularly the present relief device includes a pair of spring seated valves arranged in tandem in a relief passage with only one being effective at the start and in the low engine temperature and low altitude range of engine operation and both acting conjointly under more severe conditions. In the single valve control in which one valve seals the system and relieves internal system pressure independently of the other the other seated valve must be by-passed and in the embodiment here involved the by-pass is incorporated in a dependent hollow stem or skirt carried by the valve which closes the outermost valved opening in the vent passage. The by-pass is arranged to be closed or blocked off when the bottom of the hollow skirt is contacted by or seated against the free end of an expansible-contractible bellows device carried by the innermost valve assembly with distention of the bellows being automatic in response to increased pressure differential between atmospheric pressures acting on the exterior of the device and pressures within the inside of the device, the latter pressure being a reflection of internal system temperature. Throughout contacting relationship the extended device serves as a strut between the valves for their conjoint dependent action for increased resistance to system pressure blowoff. That is to say, the strut assumes greater stiffness to deflection as the differential between bellows internal pressure and atmospheric pressure increases and eventually force exerted by the bellows retracts the spring which seats the outermost valve but throughout the period the rise in stiffness supplements the seating force exerted by the spring for the innermost valve. Thus the last mentioned spring is effective by itself in the so-called cold relief period but its resistance is augmented by bellows expansion and the second spring as demanded by operating conditions so that much higher system pressures will prevail at times which call for maximum cooling efficiency.

An important object of the present design of altitude-temperature compensated relief valve for aircraft engine cooling systems is to arrange the parts in a way that in case the aneroid bellows fails by developing a leak during the time the engine is operating in the hot relief periods the failure will be safe against sudden loss of system contents blowing out the overflow but will maintain desired pressure operation and enable the pilot to return the craft to its home base. The tandem valve accomplishes this fail-safe feature because upon failure of the aneroid it no longer acts as a stiff strut to hold the inner valve on its seat but it allows the outer valve to be seated while system internal pressure holds the inner valve and bellows assembly back against the outer valve stem and thereby effectively restricts the by-pass. Except for the relief of system pressure in excess of the force of the outer valve spring the only loss of pressure would be due to minor leakage at a slow rate through the by-pass as might occur because of an imperfect seal made between the metal to metal contacting portions of the inner and outer valve assemblies. This seal purposely is a trifle imperfect in order to bleed off air slowly during the cold relief period and after initial bellows expansion. The bleeding of higher pressure vapors incident to bellows failure while conserving the system contents from sudden vomition will, of course, tend to a gradual reduction in system pressure but at a rate slow enough to prolong continued flight, especially if the load on the cooling system is reduced by more careful handling of the airplane and its engine. Furthermore it will be noted that notwithstanding engine pressure drop as discussed the continued operation in any event is always above atmospheric pressure and the system remains essentially a sealed system at higher than atmospheric pressure. After internal system pressure drop from the maximum to that below the force of the seating spring for the inner valve the inner valve closes and thereafter holds system internal pressure at safe limits as determined by preselection of its seating spring.

For a more detailed description reference will be made to the accompanying drawing wherein Figure 1 is a view partly in elevation and partly in section showing a preferred embodiment of the cooling system vent control device and Figure 2 shows the device with minor variations.

In the drawing the wall 1 will be understood to be an upper part of an engine coolant enclosure as, for example, the top tank of the radiator or the upper portion of a conventional overflow surge tank, which latter usually is joined to but is out of the path of the regular liquid flow circuit to afford expansion surge space for liquid in excess of system circuit capacity. Threaded into the vent opening of the wall 1 is a hollow casing 2, including a closure cap 3, from the interior of which leads an overflow vent tube 4 to atmosphere. Under the cap 3 is clamped a partition plate 5 having a central opening to receive and guide a dependent hollow skirt 6 carried by an outwardly opening valve 7 which seats on the upper face of the plate 5 under the resilient force of a relatively heavy spiral spring 8 pocketed within the central dome of the cap 3. Within the casing 2 is formed an inner valve seat or shouldered portion 9 to be engaged by a sealing ring 10 as a part of an outwardly opening inner valve assembly, including a cage 11 slidably engaging circumferentially spaced ribs 12 on the casing side wall and having secured at its upper end a flat ring 13 between which and the valve seating plate 5 is interposed a relatively light volute spring 14 to seat the inner valve. Housed by the cage 11 is a spring metal bellows 15, whose free end closure wall 16 is centrally depressed or cup-shaped to extend down through the bellows folds for bottoming on the opposite or fixed end wall 17. The fixed end wall 17 is an apertured and flanged fitting soldered or otherwise secured to the bottom of the cage 11 and has press fitted to it a tubular dependent bulb 18 projecting downwardly through the casing 2 for direct exposure within the space afforded by the cooling system wall 1. Its lower end is closed by a filler plug 19.

Both the casing 2 and the cover 3, as well as the valve seating plate 5, have lateral extensions at one side containing drilled openings for connecting the vent portion of the casing with the casing portion inwardly of the pressure relief valves and this passage contains an inwardly opening spring pressed valve 20 to seal the same unless external atmospheric pressure exceeds system pressure so that vacuum conditions will be avoided within the cooling system.

With the bellows held contracted its interior and its bulb will be filled or partially filled with liquid of the same type or such as has substantially the boiling point of the system coolant. Typical specifications for a current valve design call for a coolant mixture consisting by volume of about 30% glycol and 70% water and the several valve seating springs are selected for 10 pounds per square inch maximum gauge relief below 220° F.; 10 pounds per square inch relief above vapor pressure at 220° to 280° F.; approximately 33 pounds per square inch gauge relief above 280° F., and 1½ pounds per square inch maximum vacuum relief. Thus in the cold relief operation the opening of the inner valve will enable venting by means of the by-pass through the hollow skirt 6 of the seated outer valve 7. As system temperature rises the temperature of the liquid within the bellows will rise correspondingly and tend to expand the bellows. When its free end contacts with the bottom of the skirt 6 it restricts the by-pass opening and as its internal pressure builds up it augments the force of the spring 14 to resist unseating of the inner valve. A sudden surge in system pressure may momentarily unseat the inner valve and the excess vapor pressure within the casing will leak out through the imperfect seal between the bellows end wall 16 and the skirt 6. Continued build up of bellows internal pressure, overbalancing atmospheric pressure, eventually overcomes the resistance of the heavy spring 8 and further bellows expansion occurs to lift and open the outer valve 7 connecting the casing interior with outside atmosphere. As a safeguard against unnecessary strain and excessive bellows distention the ring 13 affords a limit stop for abutment by the free end wall of the bellows.

In Figure 2 the outer valve and its skirt are of one piece construction and control the plate opening through which the skirt projects. In Figure 1 the skirt is adjustably threaded in the valve for varying the setting at which bellows extension contacts with and meets the resistance of the heavy spring. They are held in selected adjustment by the reception in aligned slots of an inturned tab on the Z-sectioned key 21. It will be noted also that the outer valve seats over one or more openings 22 in the valve seat 5 and that these openings are located peripherally beyond the adjacent coil of the volute spring 14 so that crowding of the coils will not interfere with the free escape of pressure fluid when both valves are open.

In normal operation the vent will be controlled as indicated above. In the event the sealed bellows should become broken it will at once expand into contact with the dependent skirt and block the outer valve by-pass. This safety feature is of greatest important if the failure occurs at any time when the system is operating at maximum internal pressure inasmuch as it eliminates a sudden explosive reduction in pressure, such as might blow off a considerable quantity of system liquid and leave the engine without adequate cooling and thereby cause immediate and critical engine damage. Under such conditions of failure the inner valve no longer is held on its seat by the combined forces of both springs but the outer valve tends to be seated by the relatively heavy spring and instead of a sudden system pressure reduction the by-pass will continue to be choked off because the higher system pressure lifts the inner valve assembly against the force of the light spring and the greater the system pressure the tighter will be the sealing contact between the bellows end wall 16 and the hollow dependent skirt 6. With only a slow bleeding of vapor pressure the cooling of the engine continues although at a lesser rate of efficiency but the pilot upon noting the pressure gauge reduction at his instruments can diminish engine speed and heat rejection requirements until the plane can be brought to a landing for replacement of damaged parts and displaced liquid.

I claim:

1. A safety vent valve for airplane engine cooling systems and the like, comprising a casing having spaced apart means for communication with the system and the atmosphere, respectively, and having a pair of spaced valve seats fixed therein, a pressure relief valve engageable with the outermost fixed valve seat and having a vent passage therethrough, a relatively heavy spring for seating said valve, a second pressure relief valve engageable with the innermost fixed seat and having a relatively light spring for seating the same, and a sealed, hollow and flexible walled device which is expansible and contractible in response to differential in pressures between atmosphere and the interior of the device, said device being carried by the second valve for projection, either upon pressure differential increase or upon failure of said device to remain sealed, into cooperative relation with the first mentioned valve for both constraining independent action of the second valve and choking said vent passage in the first valve.

2. In a pressure relief valve of the character described, a casing having a pressure relief passageway therethrough, spaced apart valve seats carried by the casing in series relation with one another within the relief passageway, a pair of outwardly opening pressure responsive valves engaged with said spaced apart seats within the relief passageway, means to by-pass the outermost valve and a contractible-expansible device carried by the innermost valve in the space between said valve seats and arranged to restrict the by-pass upon device expansion.

3. In a pressure relief valve of the character described, a casing having a pair of spaced tandem valve seats, spring seated valves therefor, a combined system temperature responsive and atmospheric pressure compensating device interposed between said valves and comprising an expansible and contractible bellows, said bellows when expanded constituting a motion transmitting strut between the valves and when contracted providing operating clearance between the valves and a by-pass around the outermost valve, said by-pass leading from the clearance space between the valves and being arranged to be obstructed by the bellows on expansion thereof.

4. In a relief valve for a closed pressure system, a pair of outwardly opening pressure relief valves arranged in series relation, an expansible-contractible device interposed between said valves and responsive to both system temperature increase and atmospheric pressure decrease to expand, said device in its normally contracted condition being arranged to provide operating clearance between said valves and upon predetermined expansion to take up the clearance space between and to engage with both valves as a strut therebetween and by-pass means around the outermost valve cooperating with said clearance space so as to be fully open upon device contraction and to be blocked by device expansion.

5. Means to relieve excess pressures in a closed pressure operating system at variable pressure levels in relation to system temperature variations, including a pair of outwardly opening pressure responsive valves arranged in series relation, an extensible bellows having one end fixed to one valve and being responsive to system temperature increase for distention to bring its free end into engagement with the other valve and a by-pass around one of the valves arranged to be closed by bellows distention.

6. In a pressure relief valve for a normally closed variable temperature fluid system, a casing having a passageway for fluid flow outwardly from the system, a pair of spaced valve seats arranged in tandem within said passageway, outwardly opening spring seated valves therefor, the outer of which has a passage therethrough with a dependent skirt projected through its seat toward the other valve, and a system temperature responsive device comprising a distensible bellows having one end fixed to the inner valve with its free end arranged for contact upon bellows expansion with said skirt to block said passage through the outermost valve.

7. The structure of claim 6 wherein said skirt is adjustably joined to the outermost valve for selectively presetting the range of bellows expansion before its free end seats on the skirt.

8. The structure of claim 6 wherein a coil spring for seating the innermost valve bears against the underside of the seat for the outermost valve and the valve closed opening in said seat is located peripherally outside the adjacent end coil of the spring.

9. A safety vent for the relief of excess pressure from a closed system, including a casing having a vent passage, a first outwardly opening valve seated in said passage, a second outwardly opening valve seated in said passage in series relation to said first valve, an expansible-contractible system temperature responsive device fixed at one end to the first valve and located in the space between said series arranged valves, and an apertured abutment engageable by the free end of said device upon device expansion but arranged in spaced relation thereto when the device is contracted, the aperture therethrough extending in by-passing relation to said second valve and arranged to be blocked off by the engagement with said abutment by the expanded free end of said device.

J. E. ESHBAUGH.

REFERENCES CITED

The following references are of record in the file of this patent:

UNITED STATES PATENTS

| Number | Name | Date |
|---|---|---|
| 1,941,023 | Smith | Dec. 26, 1933 |
| 2,020,075 | Meagher | Nov. 5, 1935 |
| 2,335,762 | Hunt et al. | Nov. 30, 1943 |
| 2,351,190 | Carlson | June 13, 1944 |
| 2,400,911 | Booth | May 28, 1946 |